United States Patent [19]

Jenkins, Jr. et al.

[11] 4,213,136
[45] Jul. 15, 1980

[54] ELECTRICAL CONTACT FOR CONDUCTIVE-BACKED PAPER

[75] Inventors: Leonard E. Jenkins, Jr., Denver; Peter R. Lowe, Colorado Springs, both of Colo.

[73] Assignee: Honeywell Incorporated, Minneapolis, Minn.

[21] Appl. No.: 947,900

[22] Filed: Oct. 2, 1978

[51] Int. Cl.² ............................................ G01D 15/16
[52] U.S. Cl. ............................. 346/139 C; 346/110 R
[58] Field of Search .............. 346/110 R, 76 PH, 146, 346/139 C; 219/216

[56] References Cited

U.S. PATENT DOCUMENTS 3,995,281  11/1976  Perilhou ............................... 219/216
4,023,184  5/1977  Stillman ........................... 346/76 PH Primary Examiner—Monroe H. Hayes
Attorney, Agent, or Firm—Laurence J. Marhoefer

[57] ABSTRACT

A particulate, resilient, electrically conductive member having a low thermal mass extends across the width of a conductive-backed recording paper and conducts electrical energy to the conductive backing to heat the paper and develop an image.

The member comprises a plurality of closely spaced resilient fingers which extend across the width of the web. A curved crown on each of the fingers protrudes through a slot in a plate over which the paper passes. The ends of the fingers are restrained by the slot so that they are not readily susceptible to damage.

3 Claims, 4 Drawing Figures

U.S. Patent    Jul. 15, 1980    4,213,136
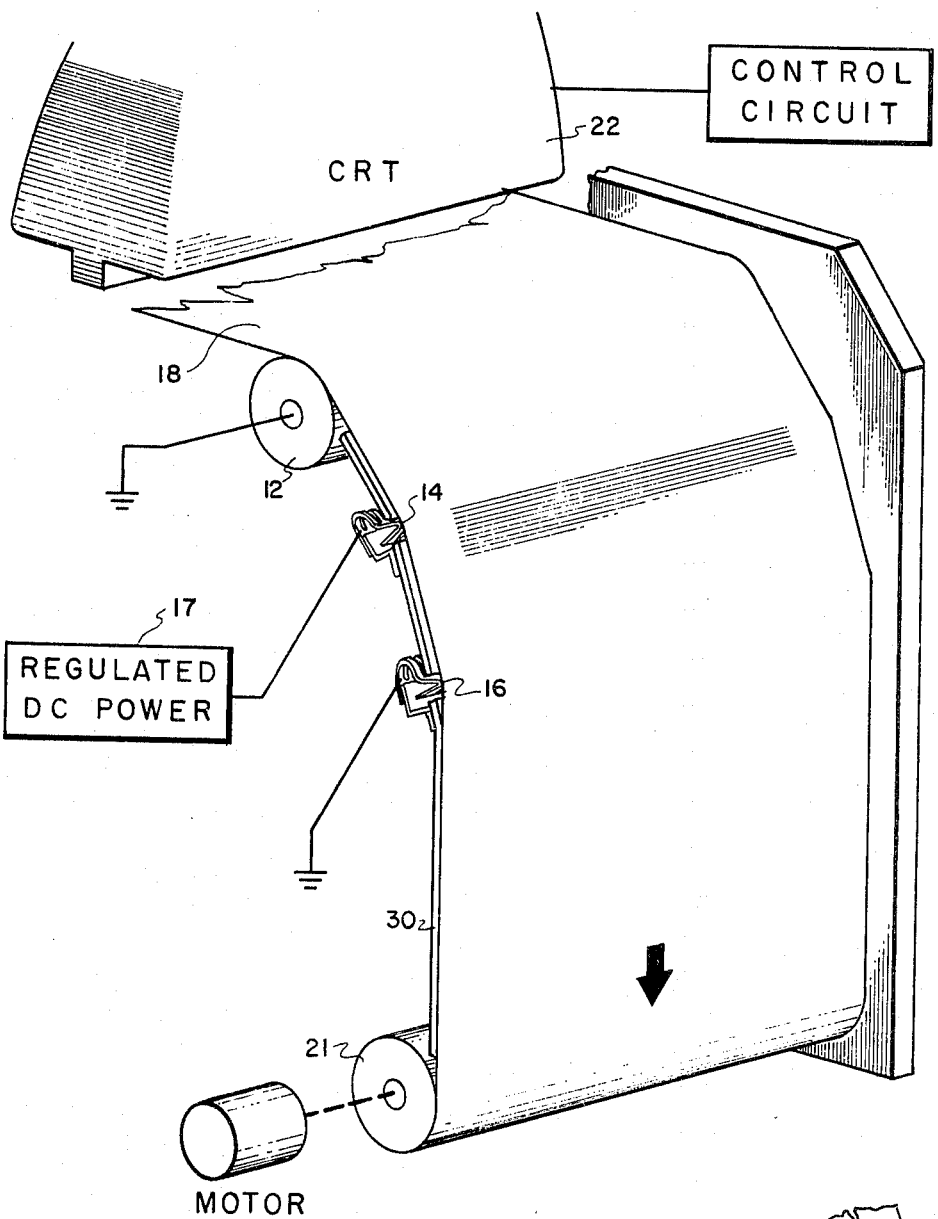
FIG. 1
FIG. 2A
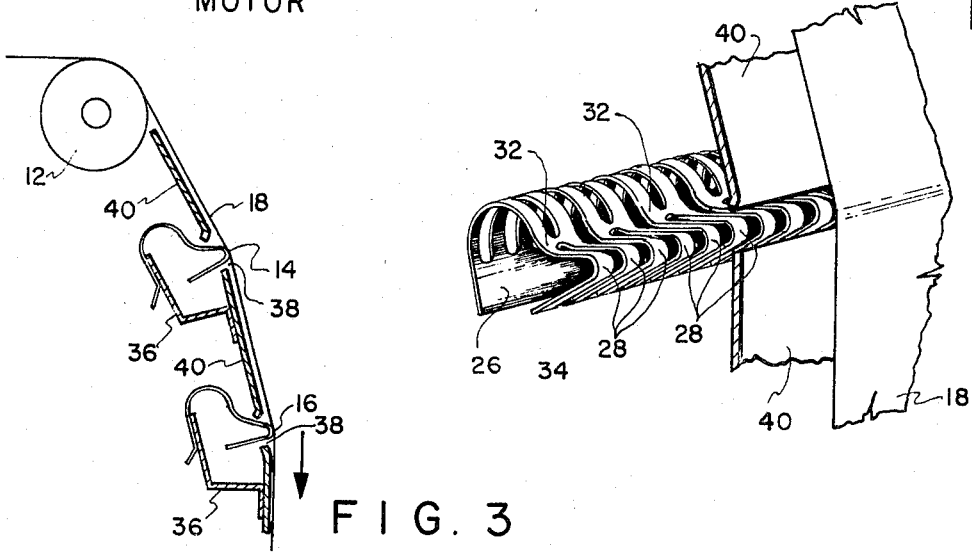
FIG. 3
FIG. 2

ELECTRICAL CONTACT FOR CONDUCTIVE-BACKED PAPER

BACKGROUND OF THE INVENTION

1. Field of the Invention

This invention relates to a recorder with an improved apparatus for making electrical contact to a conductive-backed web material upon which information is recorded and more particularly to a contact for use with dry-silver, carbon-backed recording paper.

2. Description of the Prior Art

One way to heat a moving web is to provide a conductive-backing for the web and pass an electrical current through the backing. Although conductive, the backing has a certain resistance and the amount of heat generated is a function of the quantity of current and the resistance of the backing. In the prior art, a pair of spaced electrical bars or rollers is used to provide an electrical contact between the conductive backing of the web and a source of electrical energy.

While such prior art contacts are satisfactory for some applications, they are not satisfactory for recorders employing dry-silver or other similar conductive-backed recording paper.

A copending patent application, U.S. patent application No. 888,921, filed Mar. 3, 1978 and assigned to the same assignee as this application discloses a comb-like structure of resilient fingers for making contact with the conductive coating. While the structure of that application is generally satisfactory, the fingers are somewhat easily damaged. Particularly, if a force is applied to a finger or groups of fingers in a direction opposite to the direction of paper motion, it may result in permanently deforming the fingers or distorting them.

SUMMARY OF THE INVENTION

An object of this invention is the provision of an improved comb-like finger apparatus for making electrical contact with conductive-backed webs such as dry-silver, carbon-backed recording paper and which is not readily susceptible to accidental damage.

Briefly, this invention contemplates the provision of a particulate, resilient, electrically conductive member having a low thermal mass which extends across the width of a moving conductive-backed recording web. The member conducts electrical energy to conductive backing to generate heat in the web but does not itself remove appreciable heat because of its low thermal mass. The member comprises a unitary structure of "U" shaped fingers with the crowns of the fingers protruding from a slot over which passes the conductive-backed paper.

BRIEF DESCRIPTION OF THE DRAWINGS

FIG. 1 is a fragmentary prespective view of a recorder, showing the path of the paper on which an image is to be recorded and a contact for making contact with the paper in accordance with this invention;

FIG. 2 is a detail perspective view of a preferred embodiment of the improved contact which is the subject matter of this invention; FIG. 2A is a plan view.

FIG. 3 is a detail side view with parts shown in the section of the apparatus shown in FIG. 2.

DESCRIPTION OF THE PREFERRED EMBODIMENT

DETAILED DESCRIPTION

Referring now to the drawings, FIG. 1 shows an upper roller contact 12, and an intermediate resilient finger contact 14 and a lower resilient finger contact 16. In practice, the intermediate contact 14 is energized with a suitable D.C. voltage from a source 17, and the two outer contacts 12 and 16 are at a common or ground potential.

The carbon-backed, dry silver paper web 18 is driven in the direction of the arrow in FIG. 1 by a drive roller 21. In a typical recorder of this invention the beam of the cathode ray tube (indicated schematically at 22) records information on the web 18 by impinging on dry-silver coating on the paper 18. An image is developed by heat generated in the region between the contacts 12 and 16 by a current flowing in a conductive-backing on the paper. It should be noted that since the web is cool when it reaches the first contact 12, this initial contact can be in the form of a roller or bar.

In accordance with the teachings of this invention, the intermediate contact 14 and preferably the lower contact 16 should be of the resilient finger variety. These contacts extend all the way across the paper and are shown in detail in FIGS. 2 and 3.

Referring now to FIGS. 2 and 3, the contact 14 or 16 (which are preferably identical) consists of closely spaced fingers 28 extending from a common stock or base 26. Pairs of adjacent fingers are joined at two points by webs 32 and 34 in order to impart lateral strength without appreciably affecting the overall resiliency of the assembly. FIG. 2A is a plan view of the fingers before they are bent into shape.

The fingers are secured to an insulating bar 36 and extend through a slot 38 in an insulating plate 40. The fingers have a generally "C" shaped resilient portion 44 and a generally "U" shaped portion forming a crown or apex which protrudes through the slot and makes contact with the conductive-backing on the web.

Appreciable travel of the apex of the finger is possible in a direction generally perpendicularly to the direction of paper travel due to the long flexible length of the finger between its point of attachment and its apex.

When there is no pressure on the contact fingers, they rest in contact with the sides of the slot, providing a relatively rigid assembly. The contacts 14 and 16 are fixed to the frame or base and are so disposed relative to the path of the web that they are slightly depressed by the paper. This arrangement permits the fingers to remain in contact with the conductive backing of the paper even if its buckles or otherwise distorts.

The low thermal mass of fingers causes them to reach rapidly the temperature of the paper. This is extremely important to the successful operation of the recorder.

In a typical practical embodiment of the invention, the finger may be etched from a beryllium copper sheet about 8 thousands thick. The fingers may be on the order of 30 thousands thick with slightly smaller or approximately the same slot width. The overall length of the fingers is about 2½ inches.

Accordingly, it may be seen that there has been provided in accordance with the present invention, an improved, resilient contact for conductive-backed paper.

The embodiments of the invention in which an exclusive property or privilege is claimed are defined as follows:

1. In a recorder for recording on a conductive-backed web, an apparatus for conducting electrical energy to the conductive backing on said paper comprising in combination;

a plate over which said web passes;

a slot in said plate;

an insulating member disposed beneath said slot;

a comb-like structure having a plurality of resilient fingers extending from a common base affixed to said insulating member;

said fingers having a compound curve shape with the apex of one curve extending through said slot with the ends of said fingers disposed beneath said slot.

2. In a recorder for recording on a conductive-backed web as set forth in claim 1 wherein said fingers engage the sides of said slot in the absence of an external force applied to said apex.

3. In a recorder for recording on a conductive-backed web as set forth in claim 1 wherein adjacent fingers are grouped into pairs and join at their tips and at a location intermediate their tips.

* * * * *